United States Patent [19]

Fabry et al.

[11] 4,117,454
[45] Sep. 26, 1978

[54] STROBE LIGHT SYSTEM FOR SCHOOL BUSES

[75] Inventors: Lloyd W. Fabry, Wilmette; Thomas Vinton Brame, Elmwood Park, both of Ill.

[73] Assignee: Aeroflash Signal Corporation, Chicago, Ill.

[21] Appl. No.: 768,965

[22] Filed: Feb. 16, 1977

Related U.S. Application Data

[63] Continuation-in-part of Ser. No. 588,785, Jun. 20, 1975, Pat. No. 4,011,541.

[51] Int. Cl.² .............................. B60Q 1/46; B60Q 1/26
[52] U.S. Cl. ............................... 340/81 F; 307/10 LS; 340/72; 340/74; 340/331
[58] Field of Search ............... 340/81 F, 81 R, 72, 340/74, 83, 84, 52 R, 331, 332, 106, 27 NA, 52 D; 315/77, 84, 201; 307/10 LS, 141.4

[56] References Cited

U.S. PATENT DOCUMENTS

| 3,283,206 | 11/1966 | Utt et al. | 315/201 |
| 3,444,513 | 5/1969 | Kratochvil | 340/83 |
| 3,728,713 | 4/1973 | Alten | 340/331 |
| 3,863,213 | 1/1975 | Baader | 340/74 |
| 3,873,968 | 3/1975 | Baader | 340/72 |
| 3,902,159 | 8/1975 | Parolin | 340/72 |

Primary Examiner—Donald J. Yusko
Assistant Examiner—James J. Groody
Attorney, Agent, or Firm—Michael G. Berkman

[57] ABSTRACT

A system of modifying existing light systems and for the installation of new lighting systems on school buses and similar vehicles so as simply to convert a conventional "four-light system," to a government-recommended "eight-light system," consisting of a red flashing hazard warning system including four red lights and four amber lights. The invention has particular utility in applications in which the installation of additional wiring is either inconvenient or impractical, since conversion may be effected with a minimum of disruption of existing "single wire" systems.

4 Claims, 4 Drawing Figures

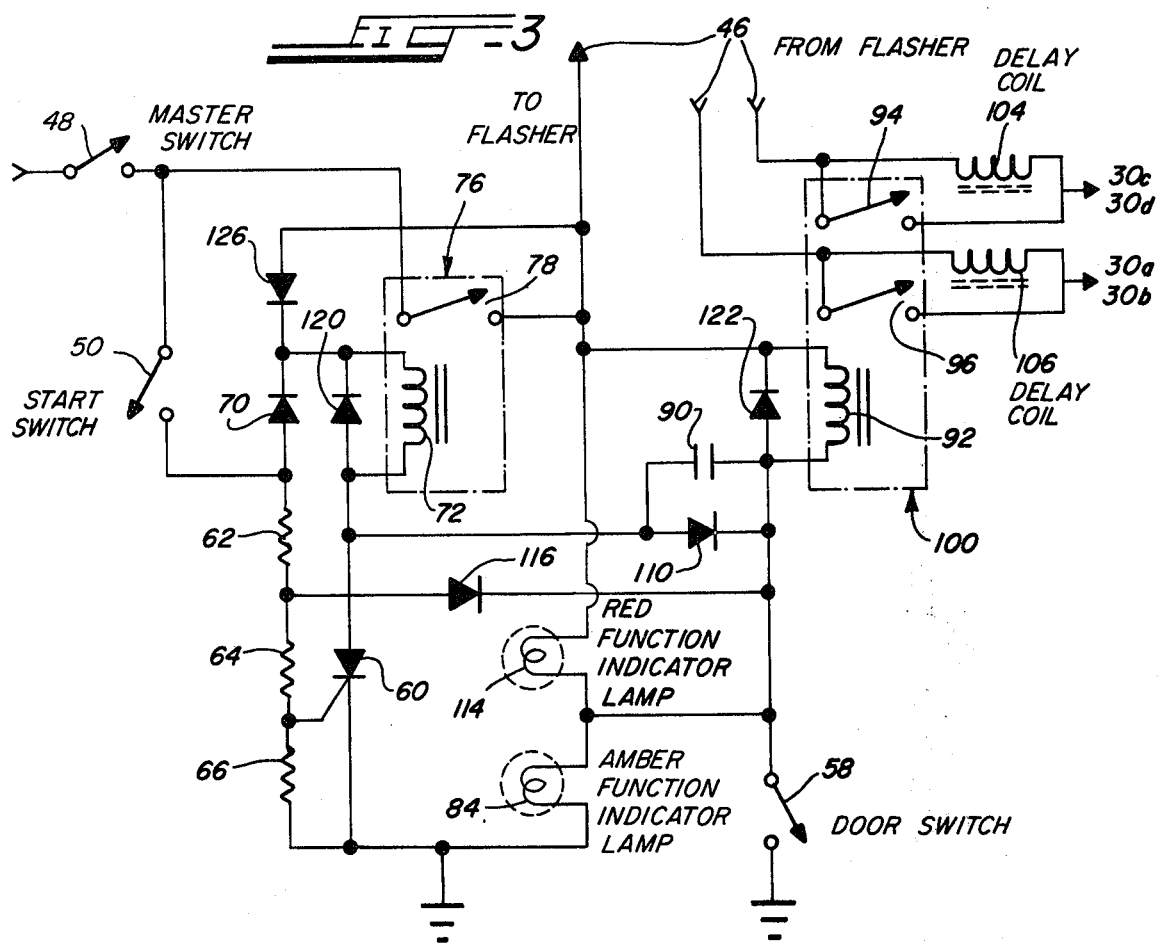
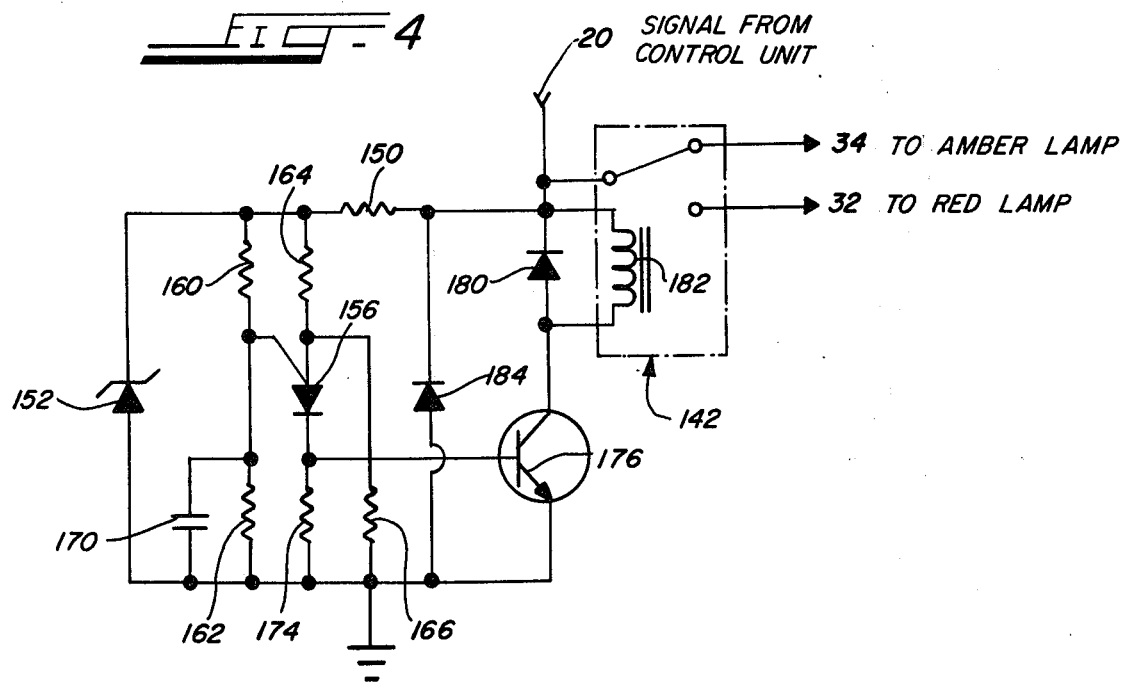

STROBE LIGHT SYSTEM FOR SCHOOL BUSES

BACKGROUND OF THE INVENTION

The present invention is a continuation-in-part of application Ser. No. 588,785, filed June 20, 1975, now U.S. Pat. No. 4,011,541.

Vehicles of the school bus type are conventionally provided with warning light systems. In the past, the hazard warning systems is buses have used four lights (red), normally of the incondescent lamp type. However, with recent revisions in safety specifications, it has become desirable to transform the prior four red light system into a more efficient and effective eight-light system, utilizing four red and four amber lights.

While providing an eight-light system in a bus of new manufacture poses no special problems, it will be appreciated that the conversion of an installed four-light system to an eight-light system would ordinarily require material disruption to add additional wires, switches, and flashers. It is an important feature of the present invention that it obviates any need for extensive rebuilding of an existing lighting system and provides a simple method whereby the necessary transformation may be quickly, efficiently, and economically achieved.

The warning light system which has been used heretofore consists of four red lamps mounted one on each side at the front and one on each side of the bus at the rear, the right side lamps and left side lamps being alternately flashed by a centrally mounted alternating flasher which is controlled by an "on/off" switch mounted on the driver's panel. The new eight-light system which is required under more modern specifications consists of two lamps, one red and one amber, mounted in the locations previously occupied by the single red lamp. There is the further requirement that a momentary switch located on the driver's panel start the amber lights flashing alternately, and that when the door is opened, the amber lights turn off and the red lamps start to flash, alternately. When the door is closed, the red lamps turn off and the system resets for the next start. If the "start" switch is pressed with the door open, the system must go directly to the red flashing mode of operation. Means must be provided whereby any mode of operation can be cancelled by momentarily opening a master switch. All switching of operational modes must be fully automatic after the initial actuation of the start switch.

It is, therefore, the aim of the present invention to provide a warning type lighting system whereby a school bus or similar vehicle may be retro-fitted with a conversion system that is both economical and relatively simple to install, on buses presently operating, thereby to meet the new requirements, and specifications.

SUMMARY OF THE INVENTION

In its preferred embodiment the present invention consists of a time domain retro-fit system for school and similar vehicles. Two basic components are involved, these being designated hereinafter as the "Control Unit" and the "Receiver." The Control Unit receives an initial signal from the "start" switch and acts automatically to begin the proper mode of operation-red flashing or amber flashing, depending on an open or closed condition of the vehicle door. This unit also modifies the voltage rise characteristics of the circuitry so that the proper mode of operation can be selected by the Receivers. One Control Unit is used in each lighting system.

The Receiver samples the voltage rise characteristics in the circuitry and, responsive thereto, switches to pulse-illuminate the colored lamps appropriate for the mode of operation selected by the Control Unit. There are four Receivers in each lighting system, one for each of the four sets of red and of amber lamps. It will be understood that in the conversion of an existing, older system, the alternating flasher, door switch, master switch and red lamps are already present in the bus before conversion to the eight-light system of the invention.

Some features of the school bus system of the present invention parallel those of the electronic light control system for airplanes described in the above-referred-to application. In each case the "turn on" of the power is modified to enable the control of two different functions with a single existent wire, and a common ground connection. Whereas in the aircraft application, the system gives the choice of one light or two lights, in the bus application the system gives the choice of one light or another light. Moreover, whereas, in the aircraft system a decoder and function control switch utilize a silicon controlled rectifier (SCR), in the bus system a programmable unijunction transistor (PUT) is used as the decoder and a relay is used to switch from one light to the other. Both systems utilize similar methods for modifying the "turn-on" voltage.

The manner in which the various structural elements described above, and others, contribute to and achieve the purposes of the invention are set forth more fully in the paragraphs below and will be understood upon consideration of the following descriptive material in conjunction with the drawings.

BRIEF DESCRIPTION OF THE DRAWINGS

The invention is described more fully and in greater detail herebelow by way of a specific example with reference to the accompanying drawings in which:

FIG.3 is a schematic drawing illustrating the circuitry of the control unit of the invention; and FIG. 4 is a schematic diagram of the electrical circuitry of the receiver unit.

DESCRIPTION OF PREFERRED EMBODIMENT

Figure 1:
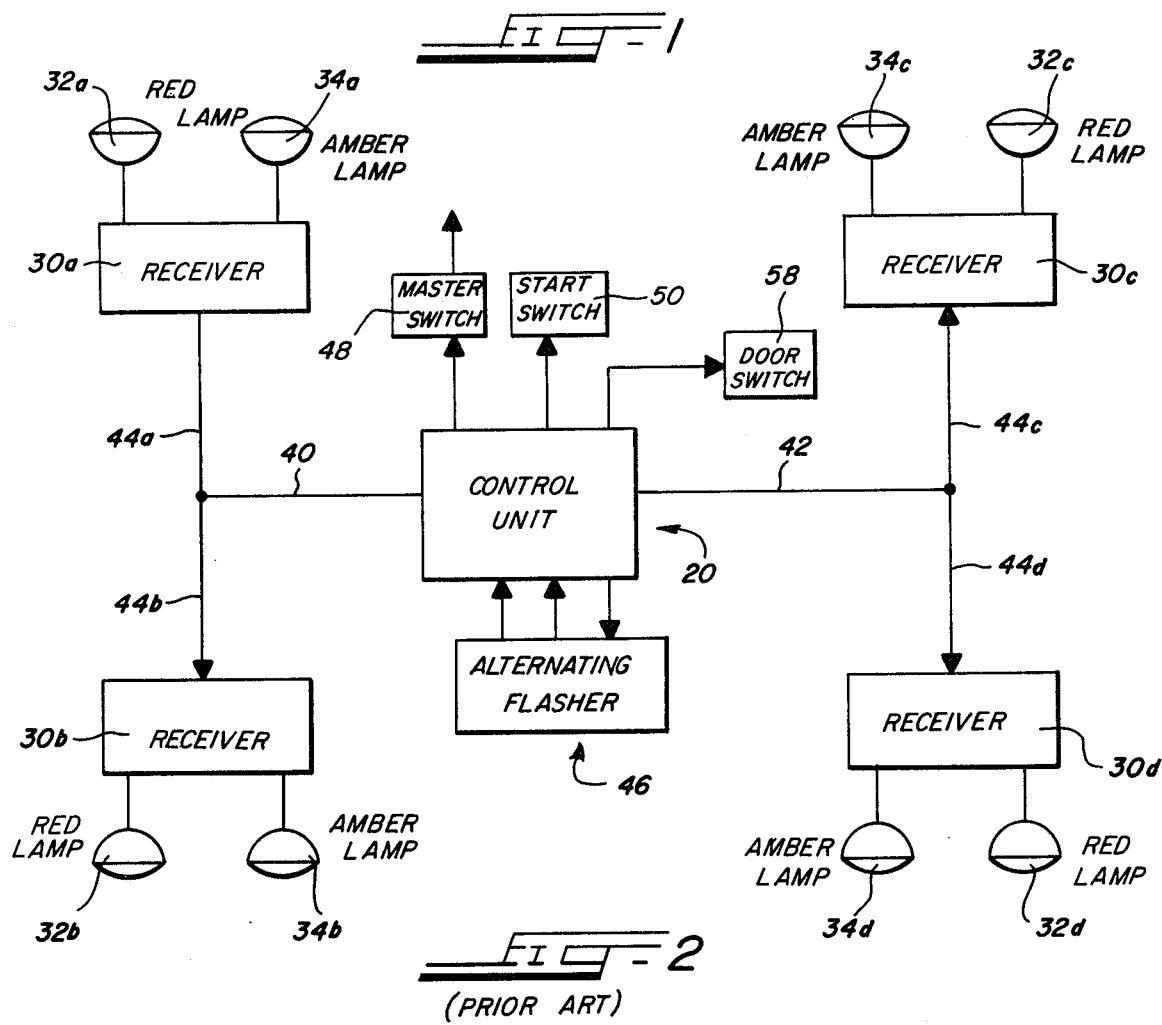
FIG. 1 is a block diagram, schematic representation of the time domain system in accordance with the present invention.
Figure 2:
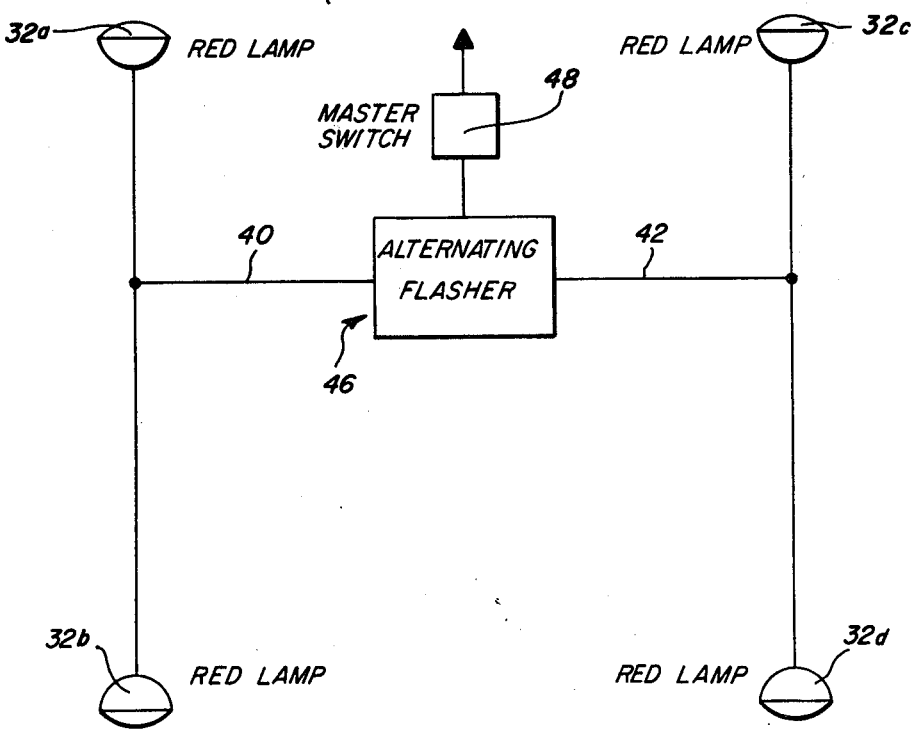
FIG. 2 is a block diagram indicating, schematically, a typical warning light system as known in the prior art.

In a preferred embodiment of the invention, the aims and objects are accomplished, as indicated schematically in FIG. 1, by providing, for use in conjunction with existing lighting equipment (FIG.2) on school buses and the like, a light control system which includes a control unit 20 and a series of cooperating receivers 30a, 30b, 30c, and 30d, the receivers controlling, respectively, red and amber lamps 32a and 34a at the left front of the vehicle, red lamps 32b and amber 34b at the left rear of the vehicle; red lamp 32c and amber 34c at the right front of the vehicle, and red lamp 32d and amber 34d at the right rear of the vehicle. It will be appreciated upon considering the block diagram of FIG. 1 and comparing that diagram with the prior art arrangement of FIG. 2, that as in the latter, there is but a single wire 40, 42 connecting each lateral light assembly with the central control unit 20. Additionally, only a single wire 44a, 44b, 44c, 44d is used as the electrical circuit conduit to each of the receivers 30. The red and amber lights are connected to an alternating flasher 46 and an ON-OFF switch 48 through the receiver 30 and the control unit 20.

The operation of the control unit 20 is described with reference to FIG. 3. Electrical power to operate the entire system is furnished by the bus power supply (not shown). Delivery of power to the system is controlled through a master switch 48, closure of the switch establishing the system as operative. Upon momentary closure of the start switch 50, and with the door switch 58 open, the door of the vehicle being closed, gate voltage is supplied to the silicon controlled rectifier 60 through the series resistor network 62, 64, 66 and anode current is supplied through the diode 70 and to the coil 72 of the relay 76. The silicon controlled rectifier 60 is latched on and the switch 78 of the relay assembly 76 is closed providing current to the flasher 46, the function indicator lamp 84, and charging the commutating capacitor 90. The current through the indicator lamp 84 and the relay coil 92 is insufficient to close the switches 94 and 96 on the two pole relay 100. Consequently, the on/off voltage from the flasher 46 is supplied to the receivers 30 through the delay coils 104 and 106. When the door switch 58 is closed, the door of the vehicle now being open, the silicon controlled rectifier 60 is commutated off by the capacitor 90 and the relay switch 76 is kept closed by the current through the diode 110. The door switch 58 closure also provides current through the coil 92 to actuate the relay 100, closing the switches 94 and 96 to bypass the delay coils 104 and 106, thus providing on/off voltage to the receivers 30 with no delay.

When the door switch 58 opens, relays 76 and 100 open and the system is reset for the next operation. If the door switch 58 is closed when the start switch 50 is momentarily closed, a diode 116 keeps the silicon controlled rectifier 60 turned off, and the system goes directly to the non-delay mode of operation.

The diodes 102 and 122 across the coils 72 and 92 of respective relays 76 and 100 inhibit negative kickback voltage when the relays open. A diode 126 is also provided to protect the start circuitry from turn-on surges. Any mode of operation can be cancelled by momentarily opening the master switch 48. It will be evident from the preceding descriptive explanation that the control unit 20 provides the automatic sequencing and coded signals for the single wire system and that it may also be adapted to control a two wire system by using a double throw relay in place of the single throw relay 100.

The operation of the receivers 30 will be described with reference to FIG. 4. The on/off voltage output received from the control unit 20 flashes the amber lights 34 if the lamp selectro relay 142 is not energized, and the red lamps 32 if the relay 142 is energized. A resistor 150 and a Zener diode 152 provide a regulated voltage supply for the operation of the delay, non-delay decoder.

The decoder section of the receiver consists of a programmable unijunction transistor 156, four bias resistors 160, 162, 164 and 166 and a timing capacitor 170. The resistance values of the bias resistors 160, 162, 164 and 166 are selected to maintain the gate voltage of the programmable unijunction transistor 156 slightly higher than the anode voltage when the "delayed on" voltage is received, and the programmable unijunction transistor 156 does not conduct. When the "non-delay on" voltage is received, a timing capacitor 170 slows the rise of the gate voltage. When the anode voltage of the programmable unijunction transistor 156 is slightly higher than the gate voltage, the transistor conducts and develops a voltage across a load resistor 174. The voltage across the load resistor 174 is applied to the base of an output transistor 176 which then conducts and actuates the relay 142, switching on the red lamps 32 instead of the amber lamps 34. A diode 180 connected across the coil 182 of the relay 142 inhibits negative kickback voltage, and a second diode 184 protects against negative line spikes.

It will be evident upon consideration of the foregoing descriptive explanation of the function of the circuitry that the receivers 30 will accomplish that mode of operation which is called for by the control unit 20. The present invention provides a simple, highly effective means for selectively controlling signalling and warning lights of school buses and other road vehicles, without any need to rewire or to add additional wires or electrical conductors in the chassis of the vehicle. All necessary changes are expeditiously and conveniently made without major dissection of existing wiring.

What is claimed is:

1. In combination with a vehicle lighting system of the type used on school buses and other vehicles as a hazard warning light system and including an alternating flasher, a door switch, and four warning lights consisting of two pairs of red lights, one pair at each end of the vehicle,
   time domain dual-function circuitry effective to convert the hazard warning light system from a four light to an eight light system, said circuitry comprising:
   a second set of four lights consisting of two pairs of amber lights, one pair at each end of the vehicle,
   control means responsive to alternative open and closed positions of said door switch to provide automatic sequencing and coding signals for predetermined alternating flash illumination of the pairs of red lights and of the pairs of amber lights of said hazard warning light system,
   receiving means for directively and selectively energizing each pair of red and each pair of amber lights to obviate any need for a direct separate wire from said control means to each light of said pairs of red lights and amber lights,
   said control means including electrical impedance circuit means constituting electronic delay-non-delay coder means and electronic switching means, said switching means being dependent upon said delay-non-delay coder means, and said coder means and said switching means being operative to modify voltage as applied to said receiver means in said hazard warning light system as a function of an open and a closed position of the vehicle door and of the door switch associated therewith.

2. The invention as set forth in claim 1 and further comprising relay-actuated switch means responsive to the opening of the vehicle door to direct lamp-illuminating current to the red lights to cause the red lights to flash alternately in pairs on each side of the vehicle.

3. The invention as set forth in claim 1 and further comprising a warning light start switch and circuit means responsive to energization of said start switch and closure of the vehicle door to effect illuminating energization of the pairs of amber lights to flash alternately in pairs on each side of the vehicle.

4. The structure as set forth in claim 1 and further comprising a programmable unijunction transistor functionally dependent upon said electronic delay-nondelay coder means, and relay means responsive to said transistor and serving as switch means to control selective energization of circuits to flash illuminate selectively the red lights and the amber lights of said hazard warning light system.

* * * * *